United States Patent
Saito et al.

(10) Patent No.: US 9,276,443 B2
(45) Date of Patent: Mar. 1, 2016

(54) ROTATING ELEMENT WITH EMBEDDED PERMANENT MAGNET AND ROTATING ELECTRICAL MACHINE

(75) Inventors: Yoichi Saito, Kariya (JP); Toshihiko Yoshida, Kariya (JP); Tatsuya Hattori, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 521 days.

(21) Appl. No.: 13/809,048

(22) PCT Filed: Jun. 27, 2011

(86) PCT No.: PCT/JP2011/064714
§ 371 (c)(1),
(2), (4) Date: Jan. 8, 2013

(87) PCT Pub. No.: WO2012/008295
PCT Pub. Date: Jan. 19, 2012

(65) Prior Publication Data
US 2013/0113325 A1    May 9, 2013

(30) Foreign Application Priority Data

Jul. 14, 2010 (JP) .................................. 2010-159584
Jul. 14, 2010 (JP) .................................. 2010-159586

(51) Int. Cl.
*H02K 1/27* (2006.01)

(52) U.S. Cl.
CPC ............ *H02K 1/2706* (2013.01); *H02K 1/2766* (2013.01)

(58) Field of Classification Search
CPC ........................ H02K 1/2706; H02K 1/2766

USPC ........................................ 310/156.12, 156.53
See application file for complete search history.

(56) References Cited

U.S. PATENT DOCUMENTS 4,924,130 A *  5/1990  Fratta ........................ 310/156.53
5,945,760 A    8/1999  Honda et al.

(Continued)

FOREIGN PATENT DOCUMENTS

CN      1505239 A    6/2004
CN      1835340 A    9/2006

(Continued)

OTHER PUBLICATIONS

International Search Report of PCT/JP2011/064714 dated Aug. 9, 2011.

(Continued)

*Primary Examiner* — Alex W Mok
(74) *Attorney, Agent, or Firm* — Sughrue Mion, PLLC

(57) ABSTRACT

A rotating element with embedded permanent magnets is provided that includes: a rotor core adapted to be within the diameter direction of a stator; first permanent magnets embedded near the exterior circumference face of the core, and orthogonally extending with a d axis; and second permanent magnets embedded on both sides of each of the first magnets, and extending along a q axis. The rotating element further includes gaps formed in the core away from both circumference direction ends of the first magnets. The gaps further include exterior end parts at the furthermost exterior side with respect to the diameter direction of the core, and interior end parts at the furthermost interior side with respect to same. The magnetic pole faces of the first magnets are located between the exterior and interior end parts of the gaps.

18 Claims, 4 Drawing Sheets

(56) References Cited

U.S. PATENT DOCUMENTS

| | | | |
|---|---|---|---|
| 6,025,667 A * | 2/2000 | Narita et al. | 310/156.53 |
| 6,087,751 A * | 7/2000 | Sakai | 310/156.56 |
| 6,121,706 A * | 9/2000 | Nashiki et al. | 310/168 |
| 6,259,181 B1 * | 7/2001 | Kawano et al. | 310/162 |
| 6,525,442 B2 * | 2/2003 | Koharagi et al. | 310/156.48 |
| 6,717,314 B2 * | 4/2004 | Horst et al. | 310/156.43 |
| 6,794,784 B2 * | 9/2004 | Takahashi et al. | 310/156.56 |
| 6,815,858 B2 * | 11/2004 | Matsunobu et al. | 310/156.45 |
| 7,436,096 B2 * | 10/2008 | Guven et al. | 310/156.53 |
| 7,504,754 B2 * | 3/2009 | Jahns et al. | 310/156.53 |
| 2003/0164655 A1 * | 9/2003 | Biais et al. | 310/156.53 |
| 2005/0140236 A1 * | 6/2005 | Jeong et al. | 310/156.53 |
| 2005/0269888 A1 * | 12/2005 | Utaka | 310/156.53 |
| 2007/0057589 A1 * | 3/2007 | Tatematsu et al. | 310/156.53 |
| 2007/0228862 A1 * | 10/2007 | Welchko et al. | 310/156.53 |
| 2009/0134732 A1 * | 5/2009 | Shichijoh et al. | 310/156.53 |
| 2009/0261774 A1 * | 10/2009 | Yuuki et al. | 318/720 |
| 2010/0007232 A1 * | 1/2010 | Komuro et al. | 310/156.01 |
| 2010/0079024 A1 * | 4/2010 | Komuro et al. | 310/156.01 |
| 2010/0166575 A1 | 7/2010 | Fukuda et al. | |
| 2011/0304235 A1 * | 12/2011 | Hashiba et al. | 310/156.76 |

FOREIGN PATENT DOCUMENTS

| | | |
|---|---|---|
| CN | 101421905 A | 4/2009 |
| JP | 3597821 B2 | 12/2004 |
| JP | 200867474 A | 3/2008 |
| JP | 2008-283746 A | 11/2008 |
| JP | 2009-112166 A | 5/2009 |
| JP | 2010-130859 A | 6/2010 |

OTHER PUBLICATIONS

Translation of the International Preliminary Report on Patentability for corresponding International Patent Application No. PCT/JP2011/064714 issued on Feb. 12, 2013.

* cited by examiner

ROTATING ELEMENT WITH EMBEDDED PERMANENT MAGNET AND ROTATING ELECTRICAL MACHINE

CROSS REFERENCE TO RELATED APPLICATIONS

This application is a National Stage of International Application No. PCT/JP2011/064714 filed Jun. 27, 2011, claiming priority based on Japanese Patent Application Nos. 2010-159584 filed Jul. 14, 2010 and JP2010-159586 filed Jul. 14, 2010 the contents of all of which are incorporated herein by reference in their entirety.

The present invention relates to a permanent-magnet-embedded rotor that includes a first permanent magnet embedded near an outer circumference surface of a rotor core and extending in a direction orthogonal to a d-axis, a second permanent magnet embedded in the rotor core and extending along a q-axis, and a gap formed in the rotor core to be distant from the first permanent magnet toward the second permanent magnet. The present invention also relates to a rotating electrical machine having the rotor.

BACKGROUND ART

As illustrated in FIG. 7, a permanent-magnet reluctance rotating electrical machine 90 disclosed in Patent Document 1 includes a stator 92 having a plurality of armature coils 91, and a rotor 93 arranged inwardly of the stator 92 in the radial direction.

The rotor 93 includes a cylindrical rotor core 94. The rotor core 94 is provided with a plurality of magnetic poles. A plurality of pairs of first hollows 95 in a rectangular shape are formed in the direction along each magnetic pole axis of the rotor core 94 with a clearance by what corresponds to a magnetic pole width. Each pair of the first hollows 95 are formed at locations holding each magnetic pole therebetween from both sides of the circumferential direction. A first permanent magnet 96 is embedded in each first hollow 95. Moreover, second hollows 97 in a rectangular shape are formed between respective magnetic poles substantially along the outer circumference of the rotor core 94. A second permanent magnet 98 is embedded in each second hollow 97.

The first permanent magnets 96 and the second permanent magnets 98 provided in the rotor core 94 increase reluctance torque. Hence, the permanent-magnet reluctance rotating electrical machine 90 has increased torque.

PRIOR ART DOCUMENT

Patent Document

Patent Document 1: Japanese Patent No. 3597821

SUMMARY OF THE INVENTION

Since the second permanent magnets 98 are located near the outer circumference surface of the rotor core 94, the alternating field interlinking with the second permanent magnets 98 becomes large, and the second permanent magnets 98 produce a large eddy current loss. Such a large eddy current loss increases the temperatures of the second permanent magnets 98, thereby reducing magnetic fluxes produced from the second permanent magnets 98. Hence, the permanent-magnet reluctance rotating electrical machine 90 has the torque reduced.

In order to reduce the eddy current loss, for example, adaptation of a magnet with a high coercive force as the second permanent magnet 98, increase of the thickness of the second permanent magnet 98, and division of the second permanent magnet 98 into a plurality of pieces are possible, but all result in the cost increase, which are undesirable.

In order to reduce the alternating field interlinking with the second permanent magnets 98, the second permanent magnet 98 may be located at a distant location from the outer circumference surface of the rotor core 94, i.e., as illustrated in FIG. 7 by dashed lines, the embedded location (the location where the second hollow 97 is formed) of the second permanent magnet 98 may be shifted toward the center of the rotor core 94. When, however, the embedded location of the second permanent magnet 98 is shifted toward the center of the rotor core 94, the second permanent magnet 98 becomes closer to the first permanent magnet 96, and thus the short-circuit flux between the first and second permanent magnets 96 and 98 increases. This reduces the magnetic flux from the second permanent magnet 98 to the stator 92. Accordingly, the permanent-magnet reluctance rotating electrical machine 90 has a reduce torque.

It is an objective of the present invention to provide a permanent-magnet-embedded rotor and a rotating electrical machine having the same that are capable of reducing an eddy current loss without reducing torque.

To achieve the foregoing objective and in accordance with one aspect of the present invention, a permanent-magnet-embedded rotor is provided that includes a rotor core, a first permanent magnet, second permanent magnets, and a gap. The rotor core is adapted to be arranged inwardly of a stator in a radial direction. The first permanent magnet is embedded in the rotor core near an outer circumferential surface thereof, and extends in a direction orthogonal to a d-axis. The second permanent magnets are embedded at both sides of the first permanent magnet in a circumferential direction, and extend along a q-axis. The gap is formed in the rotor core to be distant from both ends of the first permanent magnet in the circumferential direction toward the second permanent magnet. The gap includes, with respect to the radial direction of the rotor core, a radially outer end located at an outermost side and a radially inner end located at an innermost side. A pole face of the first permanent magnet is located between the radially outer end of the gap and the radially inner end thereof in the radial direction of the rotor core.

DETAILED DESCRIPTION OF THE PREFERRED EMBODIMENTS

A first embodiment according to the present invention will now be described with reference to FIGS. 1 and 2.

Figure 1:
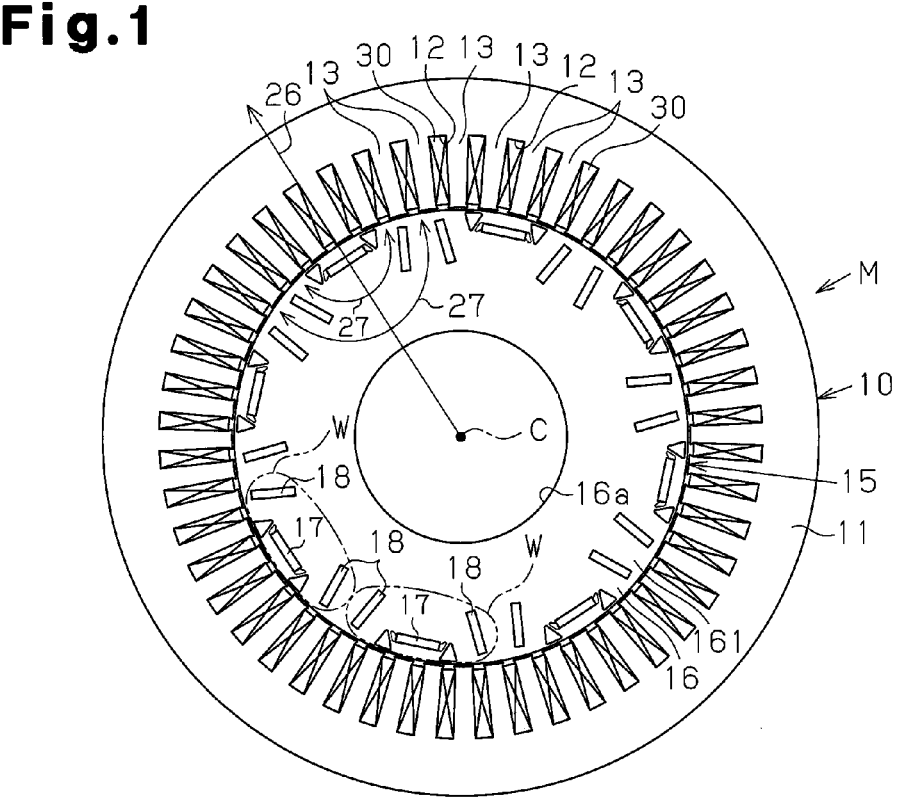
FIG. 1 is a plan view illustrating a permanent-magnet-embedded rotating electrical machine according to a first embodiment.

As illustrated in FIG. 1, a permanent-magnet-embedded rotating electrical machine M includes an annular stator 10 and a permanent-magnet-embedded rotor 15 (hereinafter, simply referred to as a rotor 15) provided inwardly of the stator 10 in a rotational manner. The stator 10 includes an annular stator core 11. The stator core 11 is formed by laminating a plurality of core plates formed of a magnetic material (steel sheet).

A plurality of teeth 13 are arranged around the inner circumference of the stator core 11. A slot 12 is formed between adjoining teeth 13 in the circumferential direction of the stator core 11. A coil 30 is built in each slot 12. As illustrated in FIG. 2, it is assumed that a length of a tooth 13 in a direction orthogonal to the radial direction of the stator core 11 is a width of the tooth 13. It is also assumed that a straight line extending through the middle point of the width of the tooth 13 and extending in the radial direction of the stator core 11 is a center axis TL of the tooth 13. Furthermore, it is assumed that a width between respective center axes TL of the pair of adjoining teeth 13 is a pitch P between the teeth 13. The width between the center axes TL of the teeth 13 gradually increases from the tip of the tooth 13 (inner end in the radial direction) toward the basal end. Hence, according to this embodiment, the width between the center axes TL of the pair of teeth 13 at respective tips, i.e., the minimum value of the width between the center axes TL is defined as the pitch P.

Next, a description will be given of the rotor 15. As illustrated in FIG. 1, the rotor 15 includes an annular rotor core 16. The rotor core 16 is formed by laminating a plurality of core plates 161 formed of a magnetic material (steel sheet). A shaft hole 16a extending all the way through the rotor core 16 is provided in the center of the rotor core. An output shaft (unillustrated) of the permanent-magnet-embedded rotating electrical machine M is fitted in and fixed to the shaft hole 16a.

Embedded in each of imaginary areas W obtained by equally dividing the rotor core 16 in the circumferential direction (in this embodiment, divided into eight areas) are a first permanent magnet 17 and two second permanent magnets 18. The first and second permanent magnets 17 and 18 are each formed in a tabular shape, and formed to have a rectangular cross section orthogonal to a center axis C of the rotor core 16.

In each imaginary area W, a magnet group that is a set of one first permanent magnet 17 and two second permanent magnet 18 serves as a magnetic pole. According to this embodiment, the magnet groups are arranged at eight locations in the circumferential direction of the rotor core 16, and thus the rotor 15 has eight magnetic poles. The plurality of magnetic poles is provided in such a manner as to have different polarities alternately in the circumferential direction of the rotor core 16. A d-axis 26 illustrated in FIG. 1 represents a direction of magnetic fluxes produced by one magnetic pole (a direction orthogonal to the lengthwise direction of the first permanent magnet 17 and extending through a space between the two second permanent magnets 18), a q-axis 27 represents an axis electrically and magnetically orthogonal to the d-axis 26, and extends like an arcuate.

Figure 2:
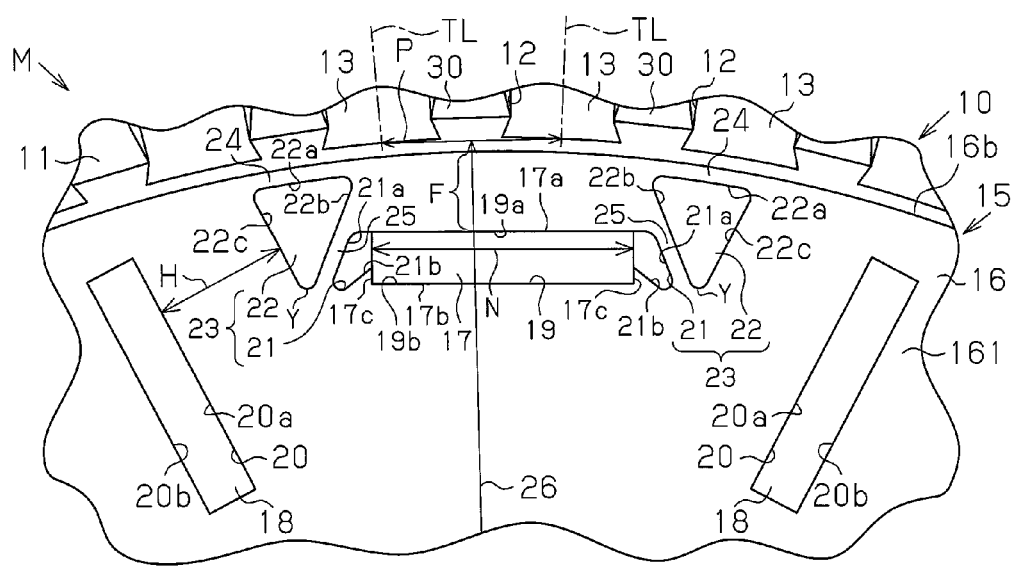
FIG. 2 is a partial enlarged view illustrating magnetic poles in a permanent-magnet-embedded rotor of the permanent-magnet-embedded rotating electrical machine in FIG. 1.

As illustrated in FIG. 2, a first embedding hole 19 is formed in each imaginary area W near an outer circumferential surface 16b of the rotor core 16. The first embedding hole 19 extends all the way through the rotor core 16 in a direction parallel to the center axis C of the rotor core 16, and extends substantially in the circumferential direction of the rotor core 16 like a slit (rectangular). More specifically, the longer side of the first embedding hole 19 is orthogonal to the d-axis 26. The first permanent magnet 17 is fitted in this first embedding hole 19.

The surface that forms the first embedding hole 19, i.e., a forming face includes an outer forming face 19a that is a longer-side forming face near the outer circumferential surface 16b of the rotor core 16, and an inner forming face 19b that is a longer-side forming face that faces the outer forming face 19a and is near the inner circumferential surface of the rotor core 16. The first permanent magnet 17 fitted in the first embedding hole 19 includes an end face near the outer circumferential surface 16b of the rotor core 16, i.e., a pole face 17a that is a surface facing the outer forming face 19a, and an end face near the inner circumferential surface of the rotor core 16, i.e., an opposite pole face 17b that is a surface facing the inner forming face 19b. The first permanent magnet 17 also includes magnet end faces 17c that are end faces at both shorter sides.

A pair of second embedding holes 20 each in a rectangular shape is formed in each imaginary area W. Each second embedding hole 20 extends all the way through the rotor core 16 in the direction parallel to the center axis C, and has a longer side extending from the inner side of the rotor core 16 in the radial direction toward the outer side thereof in the radial direction. More specifically, each pair of the second embedding holes 20 is located in V-shape becoming distant from each other from the inner side of the rotor core 16 in the radial direction toward the outer side thereof in the radial direction. The longer sides of each pair of the second embedding holes 20 extend in parallel with (along) a part of the q-axis 27 near those second holes. The second permanent magnet 18 is fitted in each second embedding hole 20. The surface forming each second embedding hole 20, i.e., the forming face includes a first forming face 20a that is a longer-side forming face near the first embedding hole 19 and a second forming face 20b that is a longer-side forming face that faces the first forming face 20a and is near the second embedding hole 20 of the adjacent magnetic pole.

Each pair of the second permanent magnets 18 is located such that the ends at the same side (e.g., a side of the rotor core 16 that corresponds to the outer-circumferential-surface-16b) have the same polarity. Moreover, respective second permanent magnets 18 located at adjacent magnetic poles are located such that the ends at the same side have different polarities. When, for example, respective ends of the pair of the second permanent magnets 18 of any given magnetic pole at the side corresponding to the outer-circumferential-surface-16b have southern polarity, then respective ends of the pair of the second permanent magnets 18 of the adjacent magnetic pole at the side corresponding to the outer-circumferential-surface-16b have northern polarity. According to this embodiment, the pair of second permanent magnets 18 is located at locations line symmetric to the d-axis 26 so that the rotor 15 can rotate in both forward and reverse directions.

The rotor core 16 has a pair of first gaps 21 formed to be continuous from both shorter sides of each first embedding hole 19. Moreover, the rotor core 16 has a pair of second gaps 22 distant from the first permanent magnet 17 toward the second permanent magnet 18, separate from the first gap 21, and formed in a substantially sector shape. Respective first and second gaps 21 and 22 extend all the way through the rotor core 16 in the direction parallel to the center axis C.

According to this embodiment, the first gap 21 and the second gap 22 located near each end of the first permanent magnet 17 form a gap portion 23.

The pair of first gaps 21 is formed in both shorter-side end faces of the first permanent magnet 17 to be gradually becoming thin as becoming distant from the corresponding first permanent magnet 17 toward the second permanent magnet 18. The surface that forms the first gap 21, i.e., the forming face of the first gap 21 includes a first forming face 21a continuous from the outer forming face 19a of the first embedding hole 19 and extending toward the inner side of the rotor core 16, and a second forming face 21b extending from a magnet end face 17c toward the inner side of the rotor core 16.

The surface that forms the second gap 22, i.e., the forming face of the second gap 22 includes an outer-circumferential-side forming face 22a extending in an arcuate shape along the outer circumferential surface 16b of the rotor core 16, a d-axis-side forming face 22b extending from an end edge near the first permanent magnet 17 between both end edges of the outer-circumferential-side forming face 22a, and a q-axis-side forming face 22c extending from the remaining end edge. The d-axis-side forming face 22b and the q-axis-side forming face 22c become close to each other toward the inner circumferential surface of the rotor core 16 from the proximity of the outer circumferential surface 16b thereof. The intersection between the d-axis-side forming face 22b and the q-axis-side forming face 22c is a radially inner end Y at the innermost location relative to the radial direction of the rotor core 16 in the second gap 22. According to this embodiment, the outer-circumferential-side forming face 22a of the second gap 22 corresponds to a radially outer end at the outermost location relative to the radial direction of the rotor core 16 in the second gap 22.

An outer-circumferential-side bridge 24 that extends in the circumferential direction of the rotor core 16 at a constant width is formed between the outer circumferential surface 16b of the rotor core 16 and the outer-circumferential-side forming face 22a of the second gap 22. That is, the side face of the outer-circumferential-side bridge 24 at the side corresponding to the second-gap-22 is the outer-circumferential-side forming face 22a of the second gap 22.

In the rotor core 16, a reinforcement bridge 25 is formed between the first and second gaps 21 and 22. That is, the side face of the reinforcement bridge 25 at the side corresponding to the first gap 21 is the first forming face 21a of the first gap 21, while the side face of the reinforcement bridge 25 at the side corresponding to the second gap 22 is the d-axis-side forming face 22b of the second gap 22. The reinforcement bridge 25 runs at a constant width substantially same as the width of the outer-circumferential-side bridge 24. Respective widths of the outer-circumferential-side bridge 24 and the reinforcement bridge 25 are preferably equal to or greater than twice the thickness of the core plate 161.

The pole face 17a of the first permanent magnet 17 is located inwardly of the outer-circumferential-side forming face 22a (radially outer end) of the second gap 22 in the radial direction of the rotor core 16, and is located outwardly of the radially inner end Y of the second gap 22 in the radial direction of the rotor core 16. That is, the pole face 17a of the first permanent magnet 17 is located between the outer-circumferential-side forming face 22a (the radially outer end) and the radially inner end Y in the radial direction of the rotor core 16. It is assumed that a distance from the outer circumferential surface 16b of the rotor core 16 to the pole face 17a along the d-axis 26 is an embedded width F of the first permanent magnet 17. It is preferable that the embedded depth F should satisfy $1/10\,P < F < 2/3\,P$, where P is the pitch between the teeth 13.

The two second permanent magnets 18 are arranged to make the gap therebetween narrowed toward the inner circumferential surface of the rotor core 16. Hence, if the first permanent magnet 17 becomes close to the inner circumferential surface of the rotor core 16, the magnet end face 17c of the first permanent magnet 17 becomes close to the second permanent magnets 18. If the first permanent magnet 17 becomes close to the inner circumferential surface of the rotor core 16 with the embedded depth F that is larger than 2/3 P, it is undesirable since the short-circuit flux between the first and second permanent magnets 17 and 18 increases excessively. Conversely, if the first permanent magnet 17 becomes close to the outer circumferential surface 16b of the rotor core 16 with the embedded depth F that is smaller than 1/10 P, the alternating field interlinking with the first permanent magnet 17 increases, and thus it is undesirable since the eddy current loss at the surface of the first permanent magnet 17 increases. The embedded depth F is set within a range that allows the first permanent magnet 17 to be arranged between the pair of second gaps 22 in the radial direction of the rotor core 16.

A length N of the first permanent magnet 17 in the lengthwise direction is preferably within a range from one to three times the pitch P between the teeth 13. When the length N is shorter than the pitch P, the first permanent magnet 17 is excessively downsized and the magnetism decreases, and thus it is undesirable since the magnetic flux produced from the first permanent magnet 17 decreases. Conversely, when the length N of the first permanent magnet 17 is larger than three times the pitch P, the first permanent magnet 17 becomes excessively long, and it is undesirable since appropriate disposition of the second gap 22 (the gap portion 23) and that of the second permanent magnet 18 become difficult from the standpoint of a magnetic pole.

In each magnetic pole, a clearance H between each second gap 22 (gap portion 23) and the second permanent magnet 18 adjacent to that second gap 22 (an interval between the q-axis-side forming face 22c of the second gap 22 and the longer-side forming face 20a of the second embedding hole 20) is preferably within a range that is 0.3 times to twice the pitch P. When this clearance H becomes smaller than 0.3 times the pitch P, the magnetic flux passing through the space between the second permanent magnet 18 and the gap portion 23 (second gap 22) decreases, and thus it is undesirable since this results in a reduction of torque by the permanent-magnet-embedded rotating electrical machine M. Conversely, when the clearance H becomes larger than twice the pitch P, the magnetic flux that passes through the space between the second permanent magnet 18 and the gap portion 23 (second gap 22) can be increased, but torque ripples also increase, and thus it is undesirable.

Next, a description will be given of operation of the permanent-magnet-embedded rotating electrical machine M having the rotor 15.

When a current is caused to flow through the coils 30, a rotating magnetic field acting on the stator 10 is produced. This rotating magnetic field, magnetic suction force between the first permanent magnet 17 and the second permanent magnet 18, and repulsion force cause the rotor 15 to rotate. At this time, since the rotor core 16 is provided with the first permanent magnets 17 and the second permanent magnets 18, the reluctance torque increases in comparison with a case in which, for example, the rotor core 16 is provided with only either one of the first permanent magnet 17 or the second permanent magnet 18, thereby increasing the torque of the permanent-magnet-embedded rotating electrical machine M.

In the rotor core 16, the first permanent magnets 17 are embedded in the rotor core 16 such that the embedded depth F of the first permanent magnet 17 satisfies 1/10 P<F<2/3 P. Hence, the first permanent magnet 17 is located at a location that is not too close to the outer circumferential surface 16b of the rotor core 16 and is also not too close to the inner circumferential surface thereof. Accordingly, it becomes possible to suppress a generation of an eddy current loss at the surface of the first permanent magnet 17, and to reduce the short-circuit flux between the first and second permanent magnets 17 and 18.

According to the above-described embodiment, the following advantages are achieved.

(1) In the rotor core 16 of the rotor 15, the first permanent magnets 17 elongated long and thin are located near the outer circumferential surface 16b of the rotor core 16. Moreover, in the rotor core 16, the two second permanent magnets 18 are arranged to hold the one first permanent magnet 17 therebetween. The first permanent magnet 17 is embedded in the rotor core 16 such that the pole face 17a at the side corresponding to the outer-circumferential-surface-16b is located inwardly of the outer-circumferential-side forming face 22a of the second gap 22 at the side corresponding to the outer-circumferential-surface-16b in the radial direction of the rotor core 16, and is also located outwardly of the radially inner end Y of the second gap 22 in the radial direction of the rotor core 16. By setting the embedded location of the first permanent magnet 17 in this manner, it becomes possible to prevent the first permanent magnet 17 from becoming too close to the outer circumferential surface 16b of the rotor core 16 even if the first permanent magnet 17 is located near the outer circumferential surface 16b of the rotor core 16, and to suppress a generation of an eddy current loss at the surface of the first permanent magnet 17. Moreover, it becomes possible to prevent the first permanent magnet 17 from becoming too close to the inner circumferential surface of the rotor core 16, thereby reducing the short-circuit flux between the first and second permanent magnets 17 and 18.

Hence, the temperature rise of the first permanent magnet 17 inherent to the eddy current loss is reduced, thereby suppressing a reduction of the magnetic flux produced by the first permanent magnet 17 and an increase of the short-circuit flux. This results in a suppression of a reduction of the torque by the permanent-magnet-embedded rotating electrical machine M. Since the eddy current loss of the first permanent magnet 17 is suppressed, it becomes unnecessary to employ a magnet having a large coercive force as the first permanent magnet 17, to make the first permanent magnet 17 thickened, and to divide the first permanent magnet 17 into a plurality of pieces. Accordingly, it becomes possible to avoid a cost increase of the first permanent magnet 17 in order to suppress a torque reduction.

(2) Since the embedded depth F of the first permanent magnet 17 is set to satisfy 1/10 P<F<2/3 P, the eddy current loss is reduced without reducing the torque by the permanent-magnet-embedded rotating electrical machine M.

(3) The length N of the first permanent magnet 17 in the lengthwise direction is preferably within a range from one to three times the pitch P between the teeth 13. Setting of the range of the length N of the first permanent magnet 17 in this manner allows the second gap 22 (the gap portion 23) and the second permanent magnet 18 to be located appropriately in the magnetic pole while suppressing a reduction of the magnetic flux generated from the first permanent magnet 17 that occurs when the first permanent magnet 17 is too short.

(4) The clearance H between the second gap 22 and the adjacent second permanent magnet 18 is preferably within a range from 0.3 times to twice the pitch P. By setting the clearance H in this manner, it becomes possible to suppress an increase of the torque ripple while suppressing a reduction of the torque by the permanent-magnet-embedded electrical rotating machine M.

(5) The two second permanent magnets 18 are arranged in each magnetic pole in such a manner as to hold the one first permanent magnet 17 therebetween and to be in a V shape that spreads from the inner side of the rotor core 16 in the radial direction toward the outer side thereof in the radial direction. Hence, the magnetic flux passing through the q-axis 27 of each magnetic pole is increased, thereby increasing the reluctance torque.

(6) The first gaps 21 are provide at both magnetic end faces 17c of the first permanent magnet 17, and the second gap 22 is located between the first permanent magnet 17 and the second permanent magnet 18. Hence, the gap portion 23 (the first gap 21 and the second gap 22) reduces the short-circuit flux between the first and second permanent magnets 17 and 18.

(7) Setting is made such that the width of the outer-circumferential-side bridge 24 and that of the reinforcement bridge 25 are equal to or greater than twice the thickness of the core plate 161, the core plate 161 ensures the strength when the core plate is punched. Accordingly, a deformation of the portions where the outer-circumferential-side bridge 24 and the reinforcement bridge 25 are to be formed is suppressed at the time of punching.

Next, a second embodiment according to the present invention will be described below with reference to FIGS. 3 and 4. The same or similar parts as those of the first embodiment will be denoted by the same reference numerals, and the detailed description thereof will be omitted.

Figure 3:
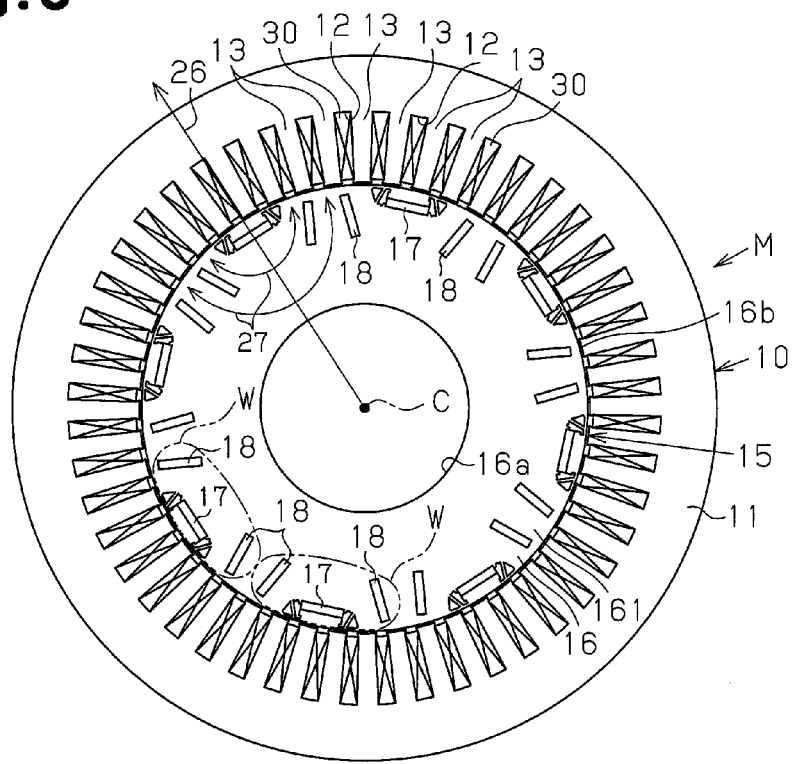
FIG. 3 is a plan view illustrating a permanent-magnet-embedded rotating electrical machine according to a second embodiment.
Figure 4:
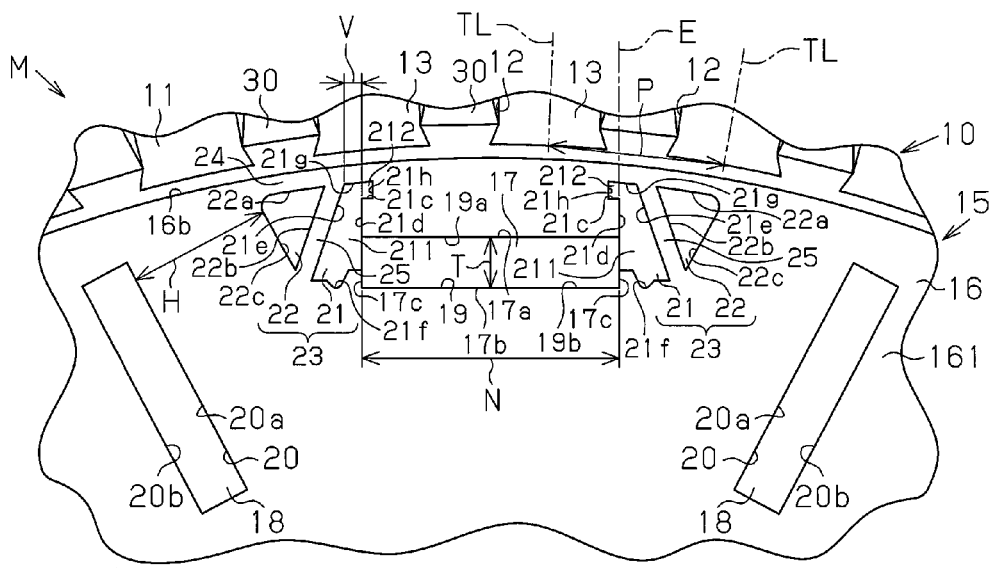
FIG. 4 is a partial enlarged view illustrating magnetic poles in a permanent-magnet-embedded rotor of the permanent-magnet-embedded rotating electrical machine in FIG. 3.

As illustrated in FIG. 3, the forming face of the first gap 21 includes an outer-circumferential-side forming face 21g extending in an arcuate shape along the outer circumferential surface 16b of the rotor core 16, and a d-axis-side forming face 21h that extends from end edge near the inner side of the first permanent magnet 17 in the circumferential direction between both end edges of the outer-circumferential-side forming face 21g in parallel with the d-axis 26. Moreover, the forming face of the first gap 21 includes a forming face 21c that runs from the inner end edge of the d-axis-side forming face 21h in the radial direction toward the second permanent magnet 18 in parallel with the pole face 17a, and an extended face 21d that extends from the end edge of the forming face 21c in parallel with the d-axis 26. Furthermore, the forming face of the first gap 21 includes a q-axis-side forming face 21e that extends from the end edge of the outer-circumferential-side forming face 21g near the second permanent magnet 18 toward the inner side of the rotor core 16 in the radial direction, and an inner-circumferential-side forming face 21f that extends from the end edge of the q-axis-side forming face 21e toward the magnet end face 17c of the first permanent magnet 17. The forming face of the first gap 21 includes the outer-circumferential-side forming face 21g, the d-axis-side forming face 21h, the forming face 21c, the extended face 21d, the q-axis-side forming face 21e, and the inner-circumferential-side forming face 21f.

The forming face of the second gap 22 includes the outer-circumferential-side forming face 22a that extends in an arcuate shape along the outer circumferential surface 16b of the rotor core 16, the d-axis-side forming face 22b that extends from the end edge of the outer-circumferential-side forming face 22a between both end edges near the first permanent magnet 17 in parallel with the q-axis-side forming face 21e, and the q-axis-side forming face 22c that extends from the end edge of the outer-circumferential-side forming face 22a near the second permanent magnet 18 along the q-axis 27.

The side face of the reinforcement bridge 25 at the side corresponding to the first-gap-21 is the q-axis-side forming face 21e of the first gap 21, while the side face of the reinforcement bridge 25 at the side corresponding to the second-gap-22 is the d-axis-side forming face 22b of the second gap 22. The width of the reinforcement bridge 25, i.e., the clearance between the q-axis-side forming face 21e and the d-axis-side forming face 22b is constant across the whole length of the reinforcement bridge 25. The reinforcement bridge 25 has a width that is preferably equal to or greater than twice the thickness of the core plate 161. Formed in each imaginary area W (magnetic pole) is the pair of reinforcement bridges 25 at both magnet end faces 17c of the first permanent magnet 17. The pair of reinforcement bridges 25 is disposed in a reversed V shape that has a pitch therebetween spreading from the side corresponding to the outer-circumferential-surface-16b of the rotor core 16 toward the inner side thereof in the radial direction.

Formed between the outer circumferential surface 16b of the rotor core 16 and the outer-circumferential-side forming faces 21g and 22a of the first and second gaps 21 and 22 is the outer-circumferential-side bridge 24 that extends at a constant width in the circumferential direction of the rotor core 16. The outer-circumferential-side bridge 24 has a width that is preferably equal to or greater than twice the thickness of the core plate 161.

The first gap 21 extends outwardly of the pole face 17a of the first permanent magnet 17 in the radial direction, and toward the second permanent magnet 18 over the magnet end face 17c. When the thickness of the first permanent magnet 17 along the d-axis 26 is T, and the shortest distance from the magnet end face 17c to the q-axis-side forming face 21e along a direction orthogonal to the d-axis 26 is V, the first gap 21 is formed to satisfy $1/3\ T < V \leq T$.

When the shortest distance V becomes smaller than 1/3 T, the pole face 17a of the first permanent magnet 17 and the reinforcement bridge 25 becomes close to each other, the magnetic flux path from the pole face 17a and passing through the reinforcement bridge 25 becomes short, and thus it is undesirable since the magnetic resistance at the magnetic flux path becomes small. Moreover, it is undesirable since the open width of the first gap 21 becomes narrow, and the short-circuit magnetic flux from the magnet end face 17c to the reinforcement bridge 25 increases. Conversely, when the shortest distance V becomes larger than the thickness T of the first permanent magnet 17, the first gap 21 becomes too large, and thus it becomes difficult to appropriately dispose the first and second gaps 21 and 22 in the magnetic pole, which is undesirable.

In the first gap 21, when a straight line extending through the extended face 21d and the magnet end face 17c and extending in parallel with the d-axis 26 is an imaginary line E, the first gap 21 includes a base 211 at the side corresponding to the second-permanent-magnet-18 over the imaginary line E and an extended part 212 extended inwardly of the first permanent magnet 17 in the circumferential direction over the imaginary line E. The base 211 is located at a location closer to the second permanent magnet 18 from the first permanent magnet 17, and the extended part 212 extends inwardly of the first permanent magnet 17 in the circumferential direction from the base 211.

The extended part 212 is formed of a part of the outer-circumferential-side forming face 21g inwardly of the first permanent magnet 17 in the circumferential direction over the imaginary line E, the d-axis-side forming face 21h, and the forming face 21c. The open width of the extended part 212 in the radial direction of the rotor core 16 is narrower than that of the base 211. Hence, the magnetic flux is not likely to pass through the base 211, but is likely to pass through the extended part 212 having the narrower open width. Accordingly, in the first gap 21, the extended part 212 has a smaller magnetic resistance than that of the base 211.

In the first gap 21, the inner-circumferential-side forming face 21f corresponds to an inner end located at the innermost location with respect to the radial direction of the rotor core 16 in the radial direction, and the outer-circumferential-side forming face 21g corresponds to an outer end located at the outermost location with respect to the radial direction of the rotor core 16 in the radial direction.

The pole face 17a of the first permanent magnet 17 is located inwardly of the outer-circumferential-side forming face 21g (radial outward end) of the first gap 21 in the radial direction of the rotor core 16, and is located at the closer location to the outer circumferential surface of the rotor core 16 than the inner-circumferential-side forming face 21f of the first gap 21. That is, the pole face 17a of the first permanent magnet 17 is located between the outer-circumferential-side forming face 21g (the radial outward end) of the first gap 21 and the inner-circumferential-side forming face 21f thereof in the radial direction of the rotor core 16. It is assumed that a distance from the outer circumferential surface 16b of the rotor core 16 to the pole face 17a along the d-axis 26 is the embedded depth F of the first permanent magnet 17. It is preferable that the embedded width should be $1/10\ P < F < 2/3\ P$, where P is the pitch between the teeth 13. The embedded width F is set within a range that permits the first permanent magnet 17 to be located between the pair of second gaps 22 (the gap portions 23).

Because of the centrifugal force produced by the rotation of the rotor 15, force toward the outer circumferential surface 16b of the rotor core 16 acts on the first permanent magnet 17, but the reinforcement bridge 25 having the mechanical strength prevents the first permanent magnet 17 from being displaced.

The magnetic flux produced by the rotating magnetic field produced at the stator 10 and the magnetic flux from the pole face 17a of the first permanent magnet 17 are concentrated at a space between the magnet end face 17c and the outer circumferential surface 16b of the rotor core 16. Assumed that the amount of current fed to the coil 30 increases, and a magnetic saturation is caused between the first gap 21 and the outer circumferential surface 16b of the rotor core 16. In this case, since the shortest distance V from the first gap 21 is set to be within a predetermined range and the reinforcement bridge 25 is moved apart from the magnet end face 17c by a predetermined distance, the magnetic flux path from the pole face 17a to the reinforcement bridge 25 is long, and the magnetic resistance increases. Hence, the short-circuit flux flowing from the pole face 17a to the reinforcement bridge 25 is reduced.

According to the above-described second embodiment, in addition to the advantages (2) to (5) and (7) of the first embodiment, the following advantages are achieved.

(1) The shortest distance V from the magnet end face 17c of the first permanent magnet 17 to the q-axis-side forming face 21e of the first gap 21 in the direction orthogonal to the d-axis 26 satisfies $1/3\ T < V \leq T$, where T is the thickness of the first permanent magnet 17. Hence, the gap portion 23 is formed such that the reinforcement bridge 25 is apart from the magnet end face 17c by a predetermined distance. Accordingly, the magnetic resistance at the magnetic flux path from the pole face 17*a* to the outer circumferential surface 16*b* of the rotor core 16 or the opposite pole face 17*b* through the reinforcement bridge 25 is increased, and thus the short-circuit magnetic flux passing through the reinforcement bridge 25 is reduced. As a result, the short-circuit magnetic flux passing through the reinforcement bridge 25 is reduced, thereby suppressing a reduction of the torque by the permanent-magnet-embedded rotating electrical machine M without changing the width of the reinforcement bridge 25, i.e., with the mechanical strength thereof being maintained.

(2) In each magnetic pole, the pair of reinforcement bridges 25 located at both ends corresponding to the magnet-end-face-17*c* of the first permanent magnet 17 is arranged in a reversed V shape having the pitch therebetween becoming wider from the side corresponding to the outer-circumferential-surface-16*b* of the rotor core 16 toward the inner side thereof in the radial direction. Hence, the distance from the magnet end face 17*c* to the q-axis-side forming face 21*e* that is a side face of the reinforcement bridge 25 gradually becomes large from the side corresponding to the outer-circumferential-surface-16*b* toward the inner side in the radial direction. Accordingly, the magnetic resistance by the first gap 21 becomes larger from the side corresponding to the outer-circumferential-surface-16*b* toward the inner side in the radial direction, and thus the short-circuit magnetic flux to the reinforcement bridge 25 through the first gap 21 is reduced.

(3) The first gap 21 is formed to extend from the pole face 17*a* of the first permanent magnet 17 toward the outer circumferential surface 16*b* of the rotor core 16, and the reinforcement bridge 25 is apart from the magnet end face 17*c* by the predetermined distance. Accordingly, the magnetic flux from the pole face 17*a* flows through the first gap 21 toward the outer-circumferential-surface-16*b* of the rotor core 16 before flowing through the reinforcement bridge 25. Accordingly, the magnetic resistance at the magnetic flux path reaching the reinforcement bridge 25 is increased in addition to ensuring the shortest distance V, and the short-circuit magnetic flux through the reinforcement bridge 25 is further reduced.

(4) The first gap 21 includes the base 211 and the extended part 212, and the extended part 212 has the open width that is in the radial direction of the rotor core 16 and is smaller than that of the base 211. Accordingly, the magnetic flux is likely to pass through the extended part 212 in comparison with the base 211, and the extended part 212 has a smaller magnetic resistance. Hence, in the rotor core 16, the base 211 and the extended part 212 cause the magnetic resistance to become gradually smaller toward the center of the first permanent magnet 17 in the circumferential direction. In comparison with a case in which no extended part 212 is formed, a change in the magnetic resistance at the rotor core 16 becomes gentle when the rotor 15 rotates, and the torque ripple of the permanent-magnet-embedded rotating electrical machine M is suppressed.

(5) The pole face 17*a* of the first permanent magnet 17 at the side corresponding to the outer-circumferential-surface-16*b* is located inwardly of the outer-circumferential-side forming face 21*g* of the first gap 21 at the side corresponding to the outer-circumferential-surface-16*b* in the radial direction of the rotor core 16, and is located closer to the outer circumferential surface of the rotor core 16 than the inner-circumferential-side forming face 21*f* of the first gap 21. By arranging the first permanent magnet 17 in this manner, even if the first permanent magnet 17 is locate near the outer circumferential surface 16*b* of the rotor core 16, the first permanent magnet 17 is prevented from becoming too close to the outer circumferential surface 16*b*, thereby suppressing an occurrence of the eddy current loss at the surface of the first permanent magnet 17. Moreover, the first permanent magnet 17 is prevented from becoming too close to the inner circumferential surface of the rotor core 16, thereby reducing the short-circuit magnetic flux between the first and second permanent magnets 17 and 18.

The above-described embodiments may be modified as follows.

Figure 5:
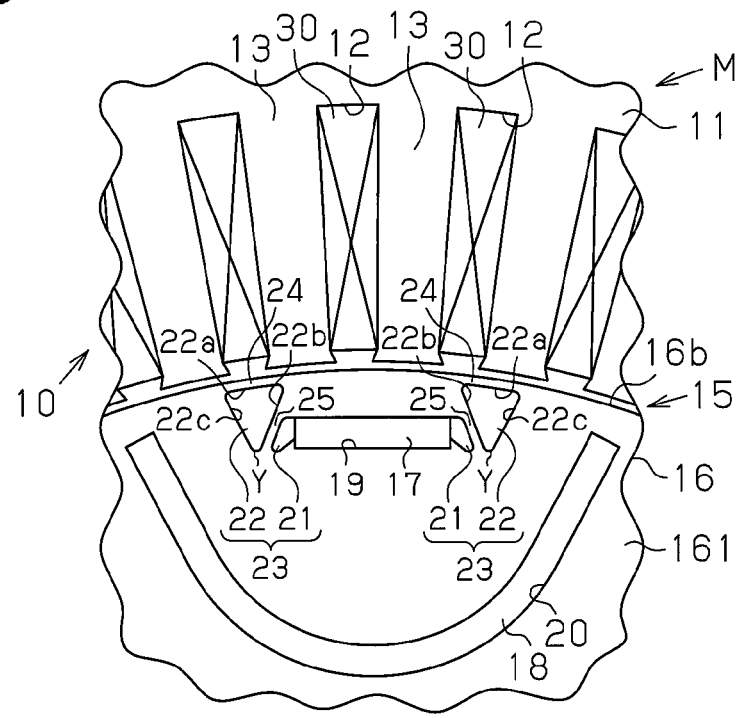
FIG. 5 is a partial enlarged view illustrating a modification of a second permanent magnet in the permanent-magnet-embedded rotating electrical machine in FIG. 1.
Figure 6:
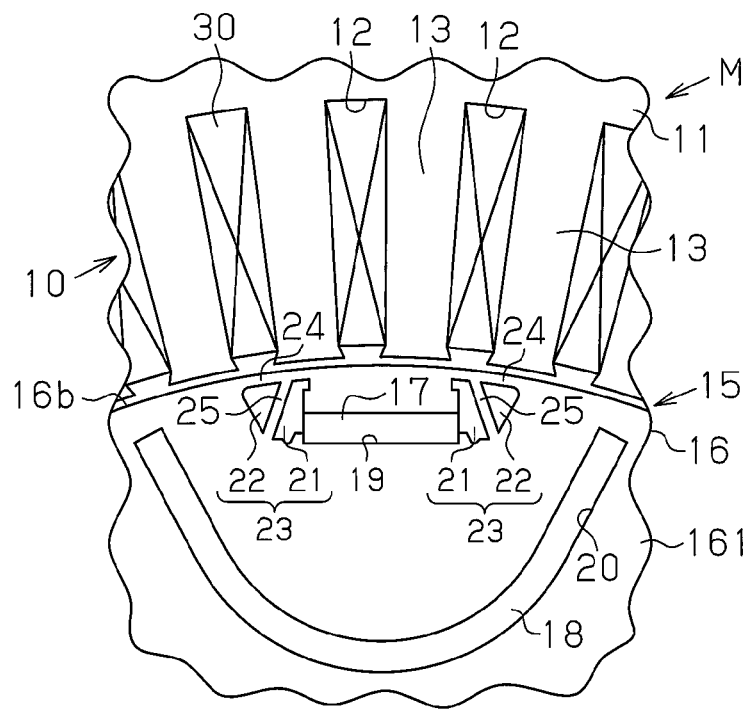
FIG. 6 is a partial enlarged view illustrating a modification of a second permanent magnet in the permanent-magnet-embedded rotating electrical machine in FIG. 3.
Figure 7:
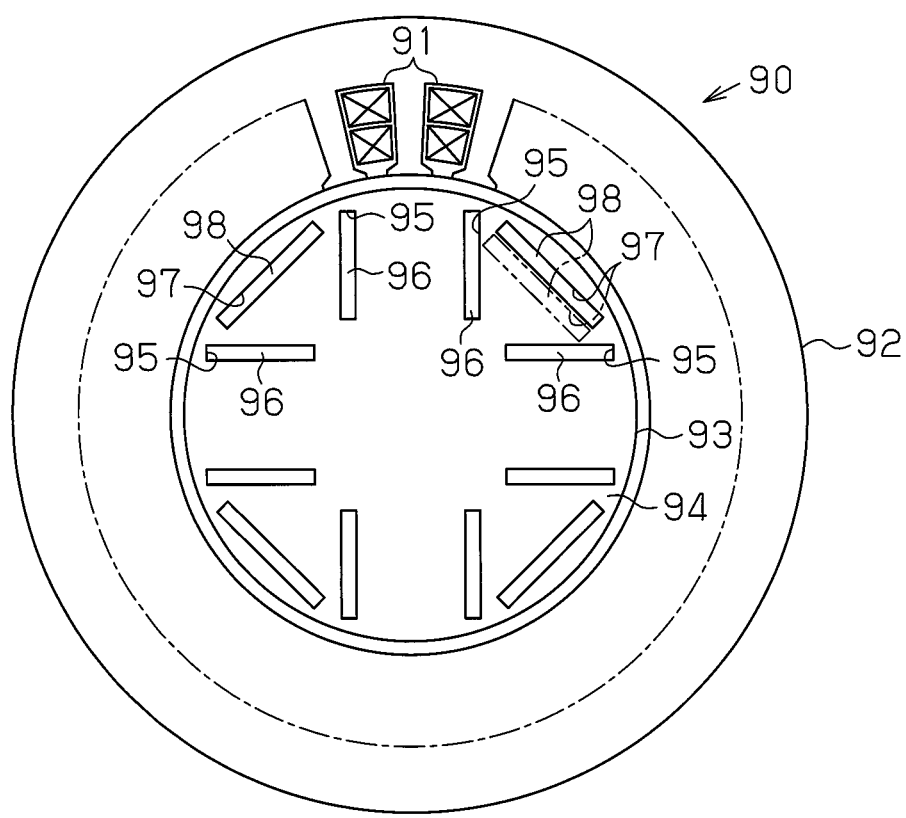
FIG. 7 is a plan view illustrating a conventional permanent-magnet reluctance rotating electrical machine.

As illustrated in FIGS. 5 and 6, respectively, the second embedding hole 20 formed in the rotor core 16 may be formed in an arcuate shape that extends along the q-axis 27 and is recessed from the outer side of the rotor core 16 in the radial direction toward the inner side thereof in the radial direction, and the second permanent magnet 18 fitted in the second embedding hole 20 may be a piece of permanent magnet having an arcuate cross-sectional shape.

According to the first and second embodiments, the pair of second embedding holes 20 is formed in each imaginary area W of the rotor core 16, and the second permanent magnet 18 is fitted in each second embedding hole 20. Instead of such a structure, a successive second embedding hole 20 in a V shape may be formed in the rotor core 16, and a second permanent magnet 18 in a V shape may be fitted in that second embedding hole 20. The V-shaped second permanent magnet 18 may be a piece of second permanent magnet 18 formed integrally, or may be a set of second permanent magnets 18 divided into a plurality of pieces.

Although the second gap 22 is formed in a substantially sector shape in the first embodiment, the shape of the second gap 22 may be changed and modified as needed.

According to the first and second embodiments, the first permanent magnet 17 and the pair of second permanent magnets 18 are arranged in a manner line-symmetric with the d-axis 26 so that the permanent-magnet-embedded rotor 15 can rotate in both forward and reverse directions. When, however, the permanent-magnet-embedded rotor 15 is configured to rotate only in one direction, it is fine if the first permanent magnet 17 and the two second permanent magnets 18 are arranged in a manner not line-symmetric with the d-axis 26.

Although the number of magnetic poles in the first and second embodiments is eight, the number of magnetic poles may be changed.

According to the second embodiment, the pair of reinforcement bridges 25 is arranged in a reversed V shape to spread the pitch therebetween from the side corresponding to the outer-circumferential-surface-16*b* of the rotor core 16 toward the inner side thereof in the radial direction. Instead of such a structure, the pair of reinforcement bridges 25 may be arranged in a V shape to reduce the pitch therebetween from the side corresponding to the outer-circumferential-surface-16*b* of the rotor core 16 toward the inner side thereof in the radial direction. Moreover, the pair of reinforcement bridges 25 may be arranged to have a constant clearance therebetween.

In the second embodiment, the outer-circumferential-side bridge 24 and the reinforcement bridge 25 may have respective widths equal to or smaller than twice the thickness of the core plate 161.

According to the second embodiment, the extended part 212 of the first gap 21 may be formed to gradually become thin toward the d-axis 26 from the base 211. In this case, the open width of the extended part 212 in the radial direction of the rotor core 16 gradually becomes small toward the d-axis 26 from the base 211. Hence, the magnetic resistance of the rotor core 16 gradually becomes small toward the d-axis 26 from the base 211, and thus a change in the magnetic resistance of the rotor core 16 becomes gentle, thereby suppressing a torque ripple.

The invention claimed is:

1. A permanent-magnet-embedded rotor comprising:
a rotor core adapted to be arranged inwardly of a stator in a radial direction;
a first permanent magnet, which is embedded in the rotor core and is located in a position spaced apart from an outer circumferential surface of the rotor core, and which extends in a direction orthogonal to a d-axis;
second permanent magnets, which are embedded at both sides of the first permanent magnet in a circumferential direction, and which extend along a q-axis; and
a gap formed in the rotor core, located in a position that is spaced apart from both ends of the first permanent magnet in the circumferential direction toward the second permanent magnet and provided with a clearance between the gap and the corresponding second permanent magnet,
a reinforcement bridge formed between the first permanent magnet and the gap,
wherein
a set of the first permanent magnet and the second permanent magnets serves as a magnetic pole, and the magnetic pole is one of a plurality of magnetic poles that are provided in such a manner as to have different polarities alternately in the circumferential direction of the rotor core,
the gap includes, with respect to the radial direction of the rotor core, a radially outer end located at an outermost side and a radially inner end located at an innermost side,
a pole face of the first permanent magnet is located between the radially outer end of the gap and the radially inner end thereof in the radial direction of the rotor core, and
the gap is formed such that a magnetic flux passes through a space between the second permanent magnets and the gap.

2. The permanent-magnet-embedded rotor according to claim 1, wherein the stator includes an annular stator core and a plurality of teeth arranged in an inner circumferential part of the stator core, and when a straight line extending in the radial direction of the stator core and through a mid point of each tooth in a widthwise direction is a center axis of the tooth, a width between the center axes of a pair of adjoining teeth is a pitch P, and a distance from the outer circumferential surface of the rotor core to the pole face along the d-axis is F, the first permanent magnet is arranged to satisfy $1/10\ P < F < 2/3\ P$.

3. The permanent-magnet-embedded rotor according to claim 2, wherein the first permanent magnet is in a thin tabular shape extending in the direction orthogonal to the d-axis, and a length of the first permanent magnet in a lengthwise direction is within a range from one to three times the pitch P.

4. The permanent-magnet-embedded rotor according to claim 2, wherein an interval between the second permanent magnet and the gap is within a range from 0.3 times to twice the pitch P.

5. The permanent-magnet-embedded rotor according to claim 1, wherein the second permanent magnets are arranged in a V shape spreading from an inner side of the rotor core in the radial direction toward an outer side thereof in the radial direction, or in an arcuate shape recessed from the outer side of the rotor core in the radial direction toward the inner side thereof in the radial direction.

6. A rotating electrical machine comprising: a stator; and the permanent-magnet-embedded rotor according to claim 1.

7. A permanent-magnet-embedded rotor comprising:
a rotor core adapted to be arranged inwardly of a stator in a radial direction;
a first embedding hole, which is formed in the rotor core and is located in a position spaced apart from an outer circumferential surface of the rotor core, and extending in a direction orthogonal to a d-axis;
a first permanent magnet embedded in the first embedding hole;
second embedding holes formed in the rotor core at both sides of the first permanent magnet in a circumferential direction, and extending along a q-axis;
second permanent magnets embedded in the respective second embedding holes;
gap portions each formed in the rotor core between the first embedding hole and each second permanent magnet, each gap portion including a first gap that is continuous to the first embedding hole and extends from each end face of the first permanent magnet in the circumferential direction toward the second permanent magnet, and a second gap located in a position that is spaced apart from the first gap toward the second permanent magnet and provided with a clearance between the second gap and the corresponding second permanent magnet; and
a reinforcement bridge formed between the first gap and the second gap,
wherein
a set of the first permanent magnet and the second permanent magnets serves as a magnetic pole, and the magnetic pole is one of a plurality of magnetic poles that are provided in such a manner as to have different polarities alternately in the circumferential direction of the rotor core,
the first gap includes, with respect to the radial direction of the rotor core, a radially outer end located at an outermost side and a radially inner end located at an innermost side, a pole face of the first permanent magnet is located between the radially outer end of the first gap and the radially inner end thereof in the radial direction of the rotor core, and
the second gap is formed such that a magnetic flux passes through a space between the second permanent magnets and the second gap.

8. The permanent-magnet-embedded rotor according to claim 7, wherein, when a thickness of the first permanent magnet along the d-axis is T and a shortest distance from each end face of the first permanent magnet to a forming face of the reinforcement bridge in the first gap is V, the gap portion is arranged to satisfy $1/3\ T < V < T$.

9. The permanent-magnet-embedded rotor according to claim 7, wherein the rotor core is formed by laminating a plurality of core plates each formed of a magnetic material, and a distance between the forming face of the reinforcement bridge in the first gap and a forming face of the reinforcement bridge in the second gap is equal to or greater than twice a thickness of the core plate.

10. The permanent-magnet-embedded rotor according to claim 9, wherein each of the first gap and the second gap includes an outer-circumferential-side forming face extending along the outer circumferential surface of the rotor core, an outer-circumferential-side bridge that extends in the circumferential direction of the rotor core is formed between the outer-circumferential-side forming face and the outer circumferential surface of the rotor core, and a distance between the outer-circumferential-side forming face and the outer circumferential surface of the rotor core is equal to or greater than twice the thickness of the core plate.

11. The permanent-magnet-embedded rotor according to claim 7, wherein the pair of reinforcement bridges located at both sides of the first permanent magnet in the circumferential direction is formed in a reversed V shape that spreads an interval between the reinforcement bridges from the outer side of the rotor core in the radial direction toward the inner side thereof in the radial direction.

12. The permanent-magnet-embedded rotor according to claim 11, wherein the stator includes an annular stator core and a plurality of teeth arranged in an inner circumferential part of the stator core, and when a straight line extending in the radial direction of the stator core and through a mid point of each tooth in a widthwise direction is a center axis of the tooth, a width between the center axes of a pair of adjoining teeth is a pitch P, and a distance from the outer circumferential surface of the rotor core to the pole face along the d-axis is F, the first permanent magnet is arranged to satisfy $1/10\, P < F < 2/3\, P$.

13. The permanent-magnet-embedded rotor according to claim 12, wherein the first permanent magnet is in a thin tabular shape extending in the direction orthogonal to the d-axis, and a length of the first permanent magnet in a lengthwise direction is within a range from one to three times the pitch P.

14. The permanent-magnet-embedded rotor according to claim 12, wherein an interval between the second permanent magnet and the second gap is within a range from 0.3 times to twice the pitch P.

15. The permanent-magnet-embedded rotor according to claim 7, wherein the second permanent magnets are arranged in a V shape spreading from an inner side of the rotor core in the radial direction toward an outer side thereof in the radial direction, or in an arcuate shape recessed from the outer side of the rotor core in the radial direction toward the inner side thereof in the radial direction.

16. The permanent-magnet-embedded rotor according to claim 7, wherein the first gap includes a base between the first permanent magnet and the second permanent magnet, and an extended part that extends from the base toward an inner side of the first permanent magnet in the circumferential direction, and with respect to a dimension of the rotor core in the radial direction, an open width of the extended part is smaller than an open width of the base.

17. A rotating electrical machine comprising: a stator; and the permanent-magnet-embedded rotor according to claim 7.

18. A permanent-magnet-embedded rotor comprising:
a rotor core adapted to be arranged inwardly of a stator in a radial direction;
a first embedding hole, which is formed in the rotor core and is located in a position spaced apart from an outer circumferential surface of the rotor core, and extending in a direction orthogonal to a d-axis;
a first permanent magnet embedded in the first embedding hole;
second embedding holes formed in the rotor core at both sides of the first permanent magnet in a circumferential direction, and extending along a q-axis;
second permanent magnets embedded in the respective second embedding holes;
gap portions each formed in the rotor core between the first embedding hole and each second permanent magnet, each gap portion including a first gap that is continuous to the first embedding hole and extends from each end face of the first permanent magnet in the circumferential direction toward the second permanent magnet, and a second gap located in a position that is spaced apart from the first gap toward the second permanent magnet and provided with a clearance between the second gap and the corresponding second permanent magnet; and
a reinforcement bridge formed between the first gap and the second gap, wherein,
a set of the first permanent magnet and the second permanent magnets serves as a magnetic pole, and the magnetic pole is one of a plurality of magnetic poles that are provided in such a manner as to have different polarities alternate in the circumferential direction of the rotor core,
when a thickness of the first permanent magnet along the d-axis is T and a shortest distance from each end face of the first permanent magnet to a forming face of the reinforcement bridge in the first gap is V, the gap portion is arranged to satisfy $1/3\, T < V < T$, and
the second gap is formed such that a magnetic flux passes through a space between the second permanent magnets and the second gap.

* * * * *